US010273923B2

(12) United States Patent
Hu et al.

(10) Patent No.: US 10,273,923 B2
(45) Date of Patent: Apr. 30, 2019

(54) SYSTEMS AND METHODS FOR CONTROLLING FLUID INJECTIONS

(71) Applicant: GM GLOBAL TECHNOLOGY OPERATIONS LLC, Detroit, MI (US)

(72) Inventors: Yiran Hu, Shelby Township, MI (US); Scott E. Parrish, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 15/381,608

(22) Filed: Dec. 16, 2016

(65) Prior Publication Data
US 2018/0171928 A1   Jun. 21, 2018

(51) Int. Cl.
*F02M 65/00* (2006.01)
*F02D 41/24* (2006.01)
*F02D 41/40* (2006.01)
*F02M 59/46* (2006.01)
(Continued)

(52) U.S. Cl.
CPC ....... *F02M 65/005* (2013.01); *F02D 41/2432* (2013.01); *F02D 41/2438* (2013.01); *F02D 41/2467* (2013.01); *F02D 41/40* (2013.01); F02D 41/0085 (2013.01); F02D 2041/2055 (2013.01); F02D 2200/0614 (2013.01); F02M 59/466 (2013.01)

(58) Field of Classification Search
CPC .......... F02M 65/001; F02M 65/005; F02D 41/2429; F02D 41/2432; F02D 41/2438; F02D 41/2451; F02D 41/2467; F02D 41/247; F02D 2041/2055; F02D 2041/224; F02D 2200/0614; F02D 2200/063
See application file for complete search history.

(56) References Cited

U.S. PATENT DOCUMENTS 4,448,066 A * 5/1984 Romblom ............. F02D 41/345
73/114.48
5,381,297 A   1/1995 Weber
(Continued)

FOREIGN PATENT DOCUMENTS

WO   2015/143107 A1   9/2015
WO   2015/143109 A1   9/2015

*Primary Examiner* — Erick R Solis
*Assistant Examiner* — Anthony L Bacon
(74) *Attorney, Agent, or Firm* — Quinn IP Law

(57) ABSTRACT

A vehicle includes an engine having a combustion cylinder, and at least one fuel injector configured to supply a number of fuel pulse to the cylinder. A controller is programmed to issue a first fuel pulse command to actuate the fuel injector allowing fuel to pass through the fuel injector as a first fuel mass. The controller is also programmed to monitor a voltage across the fuel injector, and determine a preliminary fuel injector opening magnitude based on a rate of change of voltage. The controller is further programmed to assign the preliminary fuel injector opening magnitude as a maximum fuel injector opening magnitude in response to the first fuel mass being greater than a quantity threshold. The controller is further programmed to apply a scaling factor to adjust a second fuel pulse command to normalize the maximum fuel injector opening magnitude value to a predetermined full open value.

20 Claims, 4 Drawing Sheets

(51) Int. Cl.
  *F02D 41/00*  (2006.01)
  *F02D 41/20*  (2006.01)

(56) References Cited

U.S. PATENT DOCUMENTS

| | | | |
|---|---|---|---|
| 6,253,736 B1 * | 7/2001 | Crofts | F02M 47/027 |
| | | | 123/467 |
| 7,770,813 B2 | 8/2010 | Parrish | |
| 8,755,988 B2 | 6/2014 | Parrish | |
| 2003/0200957 A1 * | 10/2003 | Shinogle | F02D 41/365 |
| | | | 123/480 |
| 2013/0152902 A1 * | 6/2013 | Brandt | F02D 41/2432 |
| | | | 123/480 |
| 2015/0040871 A1 | 2/2015 | Ravenda | |
| 2016/0177855 A1 * | 6/2016 | Kusakabe | F02D 41/20 |
| | | | 123/490 |
| 2016/0215721 A1 * | 7/2016 | Nakano | F02D 41/2467 |
| 2017/0175666 A1 * | 6/2017 | Kim | F02D 41/1402 |

* cited by examiner

SYSTEMS AND METHODS FOR CONTROLLING FLUID INJECTIONS

TECHNICAL FIELD

The present disclosure relates to controlling fluid pulse injections. More specifically, the disclosure is related to fuel injection for a combustion engine.

INTRODUCTION

Electronic fuel injection may be used to regulate fuel delivery in internal combustion engines. Certain example fuel injectors can include solenoid-actuated or piezo-electric valve devices positioned to deliver pressurized fuel into a combustion chamber of an engine cylinder. Each injector may be energized during combustion cycles for a period of time (i.e., for an injection duration) based upon the engine operating conditions. Multiple fuel injection events can occur during each combustion cycle for each cylinder. The fuel mass and timing of the multiple injections influences the quality of combustion and the overall fuel efficiency.

SUMMARY

A vehicle includes an engine having a combustion cylinder, and at least one fuel injector configured to supply a number of fuel pulses to each cylinder. A controller is programmed to issue a first fuel pulse command to actuate the fuel injector allowing fuel to pass through the fuel injector as a first fuel mass. The controller is also programmed to monitor a voltage across the fuel injector, and determine a preliminary fuel injector opening magnitude based on a rate of change of voltage. The controller is further programmed to assign the preliminary fuel injector opening magnitude as a maximum fuel injector opening magnitude in response to the first fuel mass being greater than a quantity threshold. The controller is further programmed to apply a scaling factor to adjust a second fuel pulse command to normalize the maximum fuel injector opening magnitude value to a predetermined full open value.

A method of providing quantity-controlled fluid pulses through a solenoid-driven valve includes providing a pressurized fluid at a valve inlet, and commanding a first pulse of the valve to supply a first fluid mass through the valve. The method also includes calculating at least one preliminary opening magnitude of the valve based on a change in residual voltage at the valve. The method further includes assigning the preliminary opening magnitude as a maximum opening position in response to the preliminary opening magnitude causing a fluid mass greater than a mass threshold. The method further includes storing a scaling factor based on the maximum open position of the valve relative to a predetermined full open calibration value, and adjusting subsequent fluid pulse commands using the scaling factor.

A fluid delivery system includes a solenoid configured to selectively lift a pintle of a valve to allow a pressurized fluid to pass through the valve, and a power source to supply energy to actuate the solenoid. A controller is programmed to issue commands to actuate the solenoid to cause a plurality of fluid pulses and monitor a voltage across the solenoid. The controller is also programmed to determine a first lift height based on the monitored voltage during a first fluid pulse. The controller is further programmed to assign the first lift height as a maximum lift height in response to a fluid mass of the first fluid pulse being greater than a quantity threshold. The controller is further programmed to apply a scaling factor to adjust at least one subsequent fluid pulse to normalize the maximum lift height to a predetermined full open value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
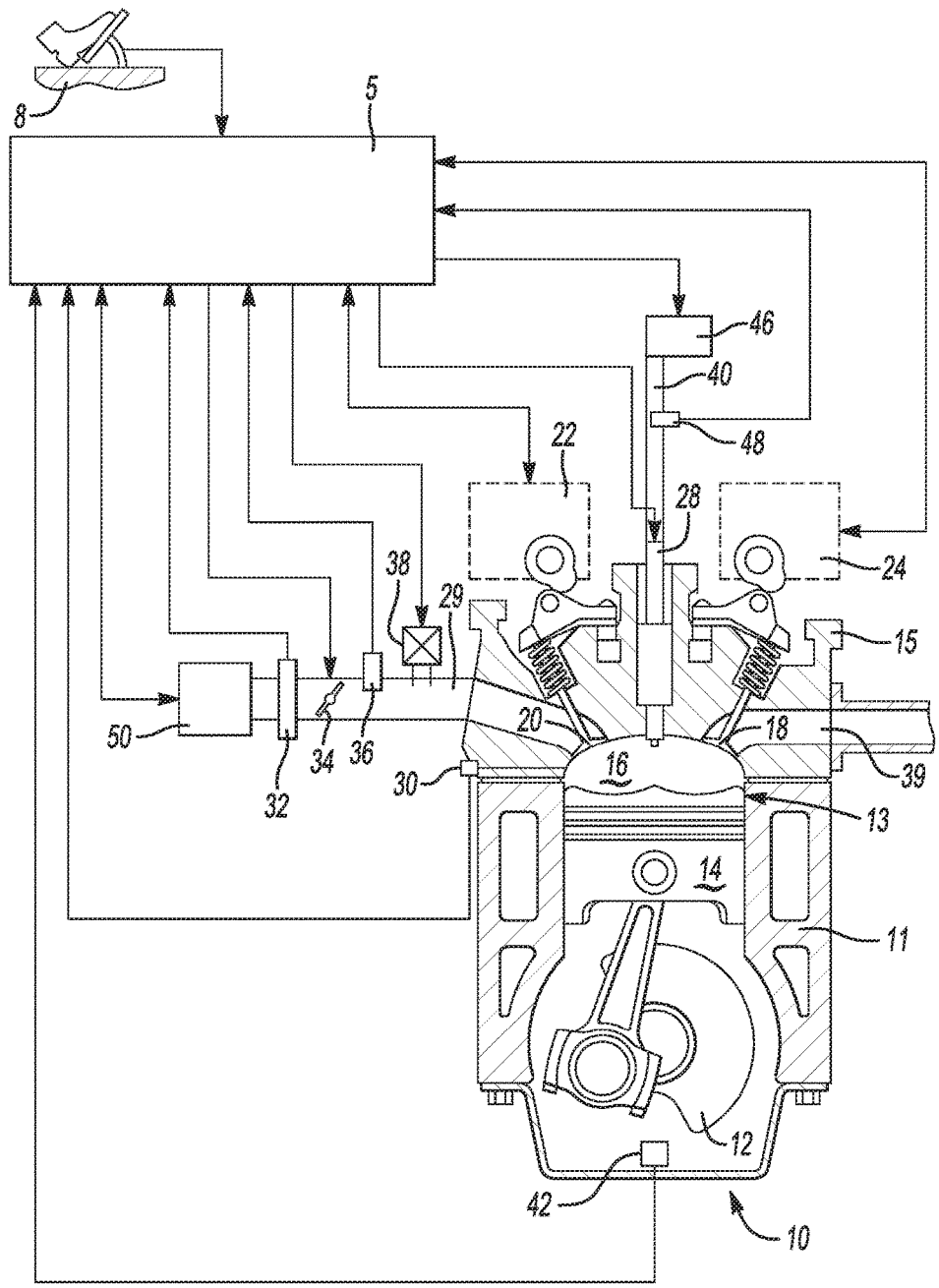
FIG. 1 is a schematic view of a combustion engine.

Referring to FIG. 1, an internal combustion engine 10 outputs torque as part of a vehicle propulsion system. The engine 10 may be operated in any of a plurality of combustion modes, including auto-ignition combustion modes and a spark-ignition combustion modes. Intake air is mixed with a combustible fuel and burned within a combustion chamber. The engine 10 may be selectively operated using a stoichiometric ratio of air to fuel. Under certain operating conditions the air-fuel ratio is deliberately adjusted to be either rich or lean relative to a stoichiometric mix. To achieve changes in the mixture ratio, the quantity of fuel and/or air delivered for combustion may be precisely regulated. Aspects of the present disclosure may also be applied to various types of internal combustion engine systems and combustion cycles. The engine 10 is selectively coupled to a transmission to transmit tractive power through a driveline of the vehicle to at least one road wheel. The transmission can include a hybrid transmission including additional propulsion sources to provide supplemental tractive power to the driveline.

Engine 10 may be a multi-cylinder, direct-injection, four-stroke internal combustion engine having at least one reciprocating piston 14 that is slidably movable within a cylinder 13. It should be appreciated that the systems and methods of the present disclosure may equally apply to different combustion cycles, for example such as those corresponding to two-stroke combustion engines. Movement of the piston 14 within a respective cylinder 13 provides a variable volume combustion chamber 16. Each piston 14 is connected to a rotating crankshaft 12 which translates linear reciprocating motion into rotational motion to rotate a driveline component.

An air intake system provides intake air to an intake manifold 29 which directs and distributes air to the combustion chambers 16. The air intake system may include airflow ductwork and devices for monitoring and controlling the airflow. The air intake system may also include a mass airflow sensor 32 for monitoring mass airflow and intake air temperature. An electronically-controlled throttle valve 34 may be used to control airflow to the engine 10. A pressure sensor 36 in the intake manifold 29 may be provided to monitor manifold absolute pressure and barometric pressure. An external flow passage (not shown) may also be provided to recirculate exhaust gases from engine exhaust back to the intake manifold 29. The flow of the recirculated exhaust gases may be regulated by an exhaust gas recirculation (EGR) valve 38. The engine 10 can include other systems, including a turbocharger system 50, or alternatively, a supercharger system to pressurize the intake air delivered to the engine 10.

Airflow from the intake manifold 29 to the combustion chamber 16 is regulated by one or more intake valves 20. Exhaust flow leaving of the combustion chamber 16 to an exhaust manifold 39 is regulated by one or more exhaust valves 18. The opening and closing of the intake and exhaust valves 20, 18 can be controlled and adjusted by controlling intake and exhaust variable lift control devices 22 and 24, respectively. The intake and exhaust lift control devices 22 and 24 may be configured to control and operate an intake camshaft and an exhaust camshaft, respectively. The rotations of the intake and exhaust camshafts are mechanically linked and indexed to the rotation timing of the crankshaft 12. Thus the opening and closing of the intake and exhaust valves 20, 18 is coordinated with the positions of the crankshaft 12 and the pistons 14.

The variable lift control devices 22, 24 may also include a controllable mechanism to vary the magnitude of valve lift, or opening, of the intake and exhaust valve(s) 20 and 18, respectively. The lift magnitude may be varied according to discrete steps (e.g. high lift or low lift) or continuously varied. The valve lift position may be varied according to the operating conditions of propulsion system, including the torque demands of the engine 10. The variable lift control devices 22, 24 may further include a variable cam phasing mechanism to control and adjust phasing (i.e., relative timing) of opening and closing of the intake valves 20 and the exhaust valves, 18 respectively. Phase adjustment includes shifting opening times of the intake and exhaust valves 20, 18 relative to positions of the crankshaft 12 and the piston 14 in the respective cylinder 15.

The variable lift control devices 22, 24 each may be capable of a range of phasing of about 60-90 degrees relative to crank rotation, to permit advancing or retarding the opening and closing of one of intake and exhaust valves 20, 18 relative to position of the piston 14 for each cylinder 15. The range of phasing is defined and limited by the intake and exhaust variable lift control devices 22, 24, which include camshaft position sensors to determine rotational positions of the intake and the exhaust camshafts. Variable lift control devices 22, 24 may be actuated using one of electro-hydraulic, hydraulic, and electric control force, controlled by the controller 5.

The engine 10 also includes a fuel injection system including a plurality of high-pressure fuel injectors 28 each configured to directly inject a predetermined mass of fuel into one of the combustion chambers 16 in response to a signal from the controller 5. While a single fuel injector is depicted in FIG. 1 for illustration purposes, the propulsion system may include any number of fuel injectors according to the number of combustion cylinders. The fuel injectors 28 are supplied pressurized fuel from a fuel distribution system through a fuel rail 40. A pressure sensor 48 monitors fuel rail pressure within the fuel rail 40 and outputs a signal corresponding to the fuel rail pressure to the controller 5.

The fuel distribution system also includes a high-pressure fuel pump 46 to deliver pressurized fuel to the fuel injectors 28 via the fuel rail 40. For example, the high-pressure pump 46 may generate fuel pressure delivered to the fuel rail 20 at pressures up to about 5,000 psi. In some examples, even higher fuel pressures may be employed. The controller 5 determines a target fuel rail pressure based on an operator torque request and engine speed, and the pressure is controlled using fuel pump 46. In one example, the fuel injector 28 includes a solenoid-actuated device to open a nozzle to inject fuel. However it is contemplated that aspects of the present disclosure may also apply to a fuel injector that utilizes a piezoelectric-actuated device or other types of actuation to distribute fuel. The fuel injector 28 also includes a nozzle placed through an opening in the cylinder head 15 to distribute pressurized fuel in the combustion chamber 16. The nozzle of the fuel injector 28 includes a fuel injector tip characterized by a number of openings, a spray angle, and a volumetric flow rate at a given pressure. An exemplary fuel injector nozzle may include an 8-hole configuration having a 70 degree spray angle and a flow rate of 10 cc/s at about 1,450 psi.

Each fuel injector may include a pintle portion near the tip of the nozzle. The pintle interfaces with the nozzle to restrict or cutoff fuel flow when biased against an orifice which is upstream of the tip. When the fuel injector is activated using energy supplied from a power source, a solenoid responds to the energy and actuates the pintle, lifting it away from the orifice to allow the high-pressure fuel to flow through. Fuel flows around the pintle and is ejected through the openings near the tip of the nozzle to spray into the combustion cylinder 16 to mix with air to facilitate combustion. A spark-ignition system may be provided such that spark energy is supplied to a spark plug for igniting or assisting in igniting cylinder charges in each of the combustion chambers 16 in response to a signal from the controller 5.

A series of multiple pintle lifts, or fuel pulses, may occur in rapid succession to obtain an optimal combustion condition without over-saturating the combustion cylinder. For example, a single longer pulse to achieve a desired target fuel mass may cause a larger than optimal depth of spray penetration into the cylinder. In contrast, multiple smaller pulses in succession that aggregate to a target fuel mass may have less overall penetration into the cylinder and create a more desirable combustion condition that results in better fuel economy and reduced emissions (e.g., particulates). Additionally, the lift height of each of the respective pintle lifts influences the mass of fuel that passes through the injector during each pulse.

The controller 5 issues fuel pulse width (FPW) commands to influence the duration over which the injector is held open allowing fuel to pass. The fuel injectors may operate in both of linear and non-linear regions of fuel mass delivery with respect to injection duration. Linear regions of fuel mass delivery include commanded injection durations, having corresponding known and unique fuel mass deliveries at a given fuel pressure. Linear regions of fuel mass delivery include regions where fuel mass delivery increases monotonically with increased injection durations at constant fuel pressure. However non-linear regions of fuel mass delivery include commanded injection durations having unknown or unpredictable fuel mass deliveries at a given fuel pressure, including non-monotonic regions where the fuel injector can deliver the same fuel mass quantity at different injection durations. Boundaries of the linear and non-linear regions may vary for different fuel injector systems.

The engine 10 is equipped with various sensing devices for monitoring engine operation, including a crank sensor 42 capable of outputting RPM data and crankshaft rotational position. A pressure sensor 30 outputs a signal indicative of in-cylinder pressure which is monitored by controller 5. The pressure sensor 30 can include a pressure transducer that translates the in-cylinder pressure level to an electric signal. The pressure sensor 30 monitors in-cylinder pressure in real-time, including during each combustion event. An exhaust gas sensor 39 is configured to monitor exhaust gases, and typically comprises an air/fuel ratio sensor. Output signals from each of the combustion pressure sensor 30 and the crank sensor 42 are monitored by the controller 5 which determines combustion phasing, i.e., timing of combustion pressure and fuel pulses relative to the crank angle of the crankshaft 12 for each cylinder 13 for each combustion event. Preferably, the engine 10 and controller 5 are mechanized to monitor and determine states of effective pressure for each of the engine cylinders 13 during each cylinder firing event. Alternatively, other sensing systems can be used to monitor states of other combustion parameters within the scope of the disclosure, e.g., ion-sense ignition systems, and non-intrusive cylinder pressure sensors.

The terms control module, module, controller, processor and other similar terms used herein mean any suitable device or various combinations of devices, including Application Specific Integrated Circuit(s) (ASIC), electronic circuit(s), central processing unit(s) (preferably including microprocessors), and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The controller 5 includes a set of control algorithms, including resident software program instructions and calibrations stored in memory and executed to provide desired functions. The algorithms are preferably executed during preset loop cycles. Algorithms are executed, such as by a central processing unit, and are operable to monitor inputs from sensing devices and other networked control modules, and execute control and diagnostic routines to control operation of any of a number of different actuators. Loop cycles may be executed at regular intervals during ongoing engine and vehicle operation. Alternatively, algorithms may be executed in response to the occurrence of one more event observed by the controller.

The controller 5 is also programmed to control the throttle valve 34 to control mass flow of intake air into the engine via a control signal. In one example, the throttle valve 34 is commanded to wide open throttle to control manifold pressure by modifying both an intake air quantity and a recirculated exhaust gas quantity. The turbocharger system 50 preferably includes a variable geometry turbine (VGT) device. The controller 5 sends a signal to direct the angle of vanes of the VGT device. The angle of the vanes is measured with a VGT position sensor to provide feedback control to the controller 5. The controller 5 regulates the level of pressure boost thereby controlling the intake air quantity and the recirculated exhaust gas quantity. In other examples, a supercharger system can be utilized to modify the manifold pressure in analogous fashion.

The controller 5 is further programmed to control quantity exhaust gas recirculation by controlling opening of the exhaust gas recirculation valve 38. By controlling the opening of the exhaust gas recirculation valve 38, the controller 5 regulates the recirculated exhaust gas rate and the ratio of exhaust gas quantity to intake gas quantity.

The controller 5 is further programmed to command a start of injection (SOI) corresponding to position of the piston 14 based on input from the crank sensor 42 during ongoing operation of the engine 10. The controller 5 causes a fuel injection event using the fuel injector 28 for each combustion event for each cylinder 13. Injection events may be defined by injector open pulse duration and injected fuel mass. In at least one example, the controller 5 commands a plurality of successive fuel injections during each combustion event. The aggregate fuel mass delivered during each combustion event is selected by the controller 5 based at least on the operator torque request. The controller 5 monitors input signals from the operator, for example, through a position of an accelerator pedal 8 to determine the operator torque request. The controller 5 issues commands to operate the fuel injector to supply a series of fuel pulses that sum to an aggregate target fuel mass.

The application of multiple fuel pulses in close succession may cause effects on subsequent pulses due to residual energy remaining in the fuel injector as well as residual armature motion caused by the earlier pulses. And in a more general sense, later fuel pulses, whether closely-spaced or not, may benefit from data gathered during earlier fuel injector operation. In some examples, the controller 5 may employ feedback from monitored signals indicative of system operation. Closed-loop control of fuel injectors may rely on determining an opening delay to be estimated for each injector. And, directly and accurately measuring the opening delay can be difficult in real time.

Figure 2:
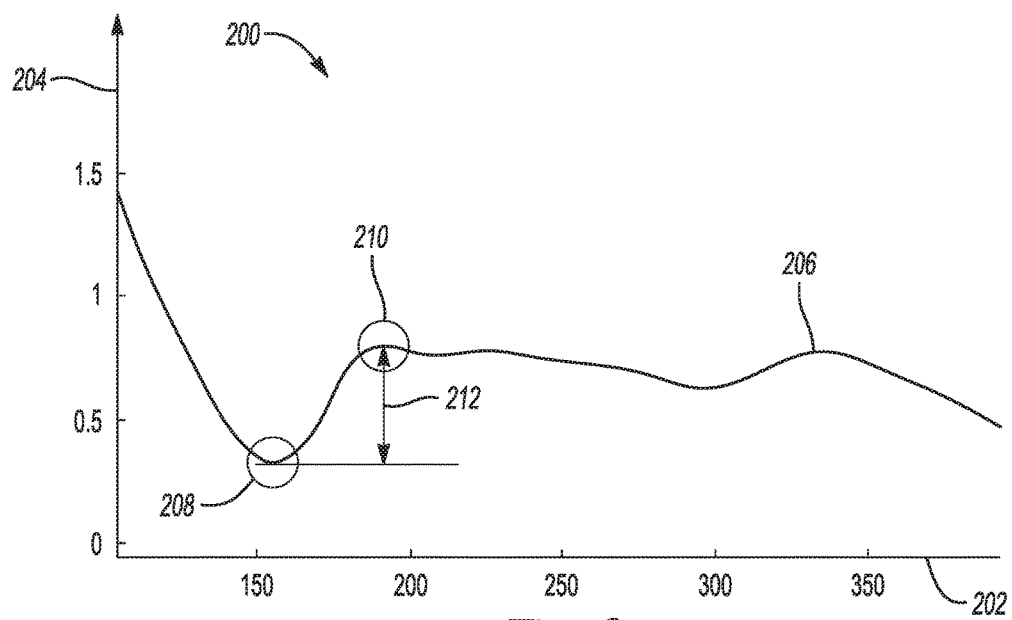
FIG. 2 is a plot of rate of change of voltage across a fuel injector versus time.

A voltage signal from each fuel injector may be monitored to indicate fuel injector performance. More specifically, the derivative, or rate of change dV/dt of the voltage is used to demarcate timing of certain events related to fuel injector actuation. Referring to FIG. 2, plot 200 depicts a profile of rate of change of injector voltage, dV/dt. Horizontal axis 202 represents time in μs. Vertical axis 204 represents rate of change of a voltage across the injector in volts per second (V/s). Curve 206 represents a profile of a rate of change of injector voltage during a fuel pulse. Certain features of the dV/dt profile correspond to key events during the injection pulse. A local minimum at about location 208 correlates to a point in time when the injector pintle closes, or closing time CT. The voltage is monitored by the controller for indications of valve closing time in response to issuance of the PWM command. The closing time CT is the duration of time from the PWM command (may be measured from the beginning or the end of the command) to the conclusion of a single fuel pulse event. An adjacent local maximum at about location 210 corresponds to a voltage spike following the closing of the valve. As discussed above, residual voltage following the pulse requires time to dissipate. The change in dV/dt between the local minimum at about location 208 and the local maximum at about location 210 correlates to the valve lift height, or opening magnitude OM, of the valve. More specifically, the controller may calculate the OM based on the magnitude 212 of the change of dV/dt.

That is, the dV/dt magnitude of change 212 from the local minimum to the next local maximum correlates to the valve opening magnitude. The opening magnitude OM is in turn correlated to the amount of metered fuel in the ballistic region and can be used to indirectly determine injector opening delay for certain conditions. Both the closing time CT and opening magnitude OM can be directly measured form voltage profile dv/dt.

Additional operating factors may reduce accuracy and/or precision of the quantity of fuel injection pulses. For example, the variation of mechanical and electrical components within each injector can cause substantial quantity variations from injector to injector (for the same design/model of the injectors) even when open loop control is applied. Injection quantity has high correlation with the opening time of the injection. This relationship holds true for both single and multiple injection scenarios. Note that the opening time for an injection is defined as the amount of time that fuel is actually flowing through the injector. As such, a closed-loop control can be used to control each injection to a desired quantity by controlling the opening time of the injection to a desired opening time, which may be characterized in an offline calibration based on a set of reference injectors. Individual injectors carry some inherent performance differences from a set of reference injectors upon which the injector calibrations are based.

As described above, the closing time CT can be estimated for each injection using the injector residual voltage. Opening magnitude OM of a given pulse is correlated with fuel metered even in the ballistic region and can be used to extract injector opening delay. Under certain operating conditions, both CT and OM are used to estimate the deviation of the opening delay OD of a particular injector from a reference injector. Thus improvements in estimation of the opening magnitude OM of each of the fuel injectors during different operating conditions can improve the overall control accuracy of fuel pulses.

Figure 3:
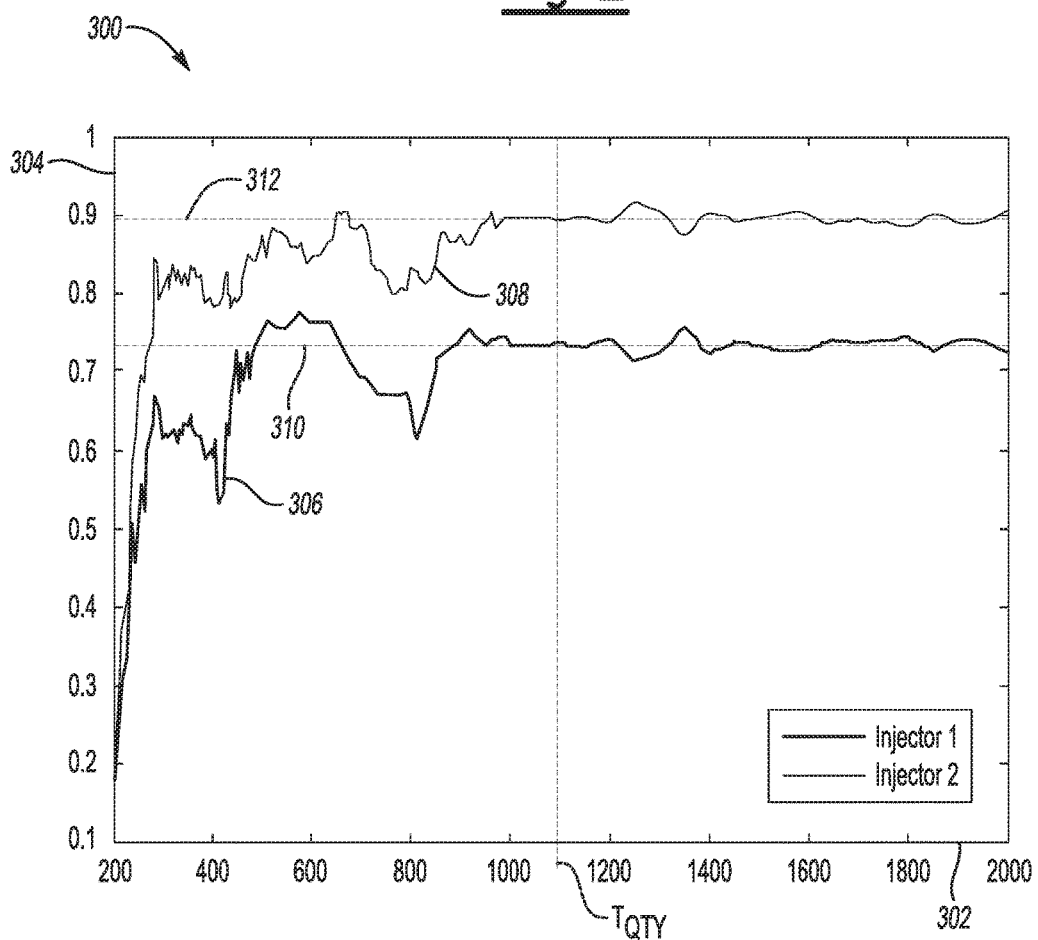
FIG. 3 is a plot of non-adjusted fuel injector opening magnitude versus commanded pulse width.

Referring to FIG. 3, plot 300 depicts operation of two different fuel injectors in response to a range of different fuel pulse commands. Horizontal axis 302 represents FPW commanded in µs. Vertical axis 304 represents the degree of the injector opening magnitude OM, where fully closed carries a value of substantially zero. As discussed above, OM may be calculated based on monitoring dv/dt, or residual voltage during an injection, with reference back to the characterization of a master fuel injector. The fully open position of the master fuel injector corresponds to an OM value equal to 1.0 (not shown). A first injector is characterized by curve 306, and a second fuel injector is characterized by curve 308. Each of the first injector and the second injector are of the same part type, and calibrated based on the same master fuel injector. It can be seen that for small quantity fuel injections (e.g., resulting from a FPW command less than about 1,000 µs), there are instances where the fuel injectors do not reach maximum lift height during a fuel pulse. Also, the OM associated with each particular fuel injector approaches a constant value as the commanded injection quantity increases—the constant value corresponds to the full open valve lift height. In other words, each fuel injector eventually fully opens in response to commanded pulse widths having a fluid mass greater than a quantity threshold.

As depicted in FIG. 3, operation of the sample fuel injectors includes variation causing full open condition at OM values other than 1.0 when using only the correlation from the master fuel injector calibration. Specifically, curve 306 representing the sample first fuel injector approaches a first constant value 310, equal to about 0.73. And, curve 308 representing the second sample fuel injector approaches a second constant value 312, equal to about 0.89. It should also be appreciated that for small quantity injections, the magnitude of error is even more significant due to the smaller fuel masses delivered during a given pulse. Such fuel injector part-to-part variations (as well as measurement circuit variation) and the corresponding inconsistency of the calculated OM for different injectors can lead to an inaccurate opening delay calculation and further error in the aggregate fuel mass delivered for a series of pulses.

The settled constant value achieved at larger FPW commands, even though different for each fuel injector, can be used to determine a scaling factor in real-time to achieve a normalized OM calculation across injectors. This is in part because the variation in individual injector physical maximum opening magnitude is negligible relative to other variation sources. As discussed above, the OM value approaches a constant value for larger injection quantities, and can be used to rescale the overall OM calculations to obtain a consistent calculation between injectors. Generally, it is necessary to independently scale calculated OM values for each of a number of fuel injectors to normalize OM back to a master fuel injector. On-board calibration is performed such that the scaling factor is learned in real-time on an ongoing basis for each injector. Providing an algorithm to conduct learning over the course of the operating life of each injector guards against aging of the injectors which may change the respective OM calculations.

Figure 4:
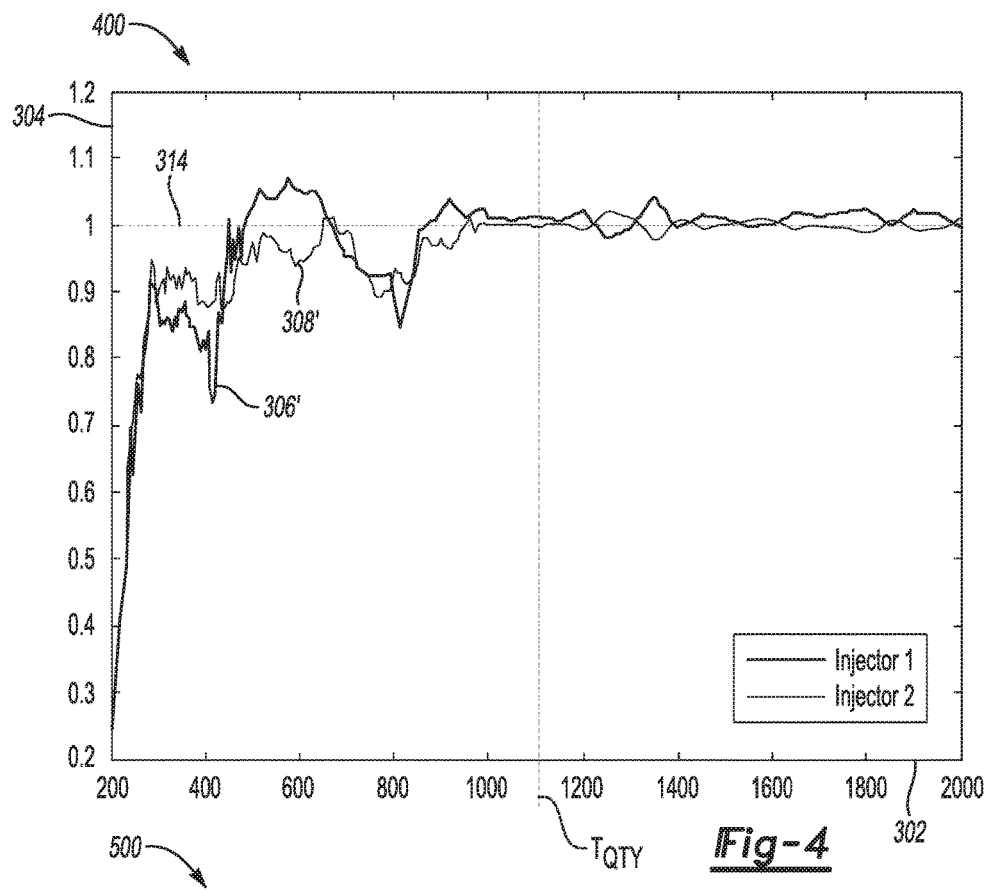
FIG. 4 is a plot of adjusted fuel injector opening magnitude versus commanded pulse width.

Referring to FIG. 4, plot 400 depicts the results of opening magnitude calculations that have been scaled to account for differences between the two example fuel injectors and a master fuel injector. Similar to plot 300 discussed above, horizontal axis 302 represents FPW commanded in µs, and vertical axis 304 represents the degree of the injector opening magnitude OM. The preliminary OM associated with each particular fuel injector is scaled to adjust the maximum opening magnitude to better align with the known maximum opening magnitude of the master fuel injector. Curve 306' represents the scaled opening magnitude for first example fuel injector, and curve 308' represents the scaled opening magnitude for second example fuel injector. The scaling technique aligns the maximum lift position of each injector to a predetermined value 314 (i.e., 1.0 in the examples of FIG. 4). It should be appreciated that the adjustment amount required for each fuel injector may be unique, and thus independent scaling may improve the overall fuel pulse accuracy of the respective injectors. The required amount of adjustment for each injector is stored in memory and used to adjust future opening magnitude calculations for the each respective fuel injector.

According to some examples, the calculation of a real-time opening delay OD is disabled for a new injector until there is sufficient amount of opportunity to learn the scaling factor for an accurate calculation of OM. The more accurate OD estimates improve fuel control accuracy, particularly in ballistic regions encountered when delivering small quantity injections. In this case a default OD value based on the master injector calibration may be used to generate FPW commands until a sufficient number of large quantity fuel pulses are requested. The number of large quantity pulses needed to develop a scaling factor may depend on the operating conditions and the stability of the data. During normal engine operation, there are several conditions where the required fuel mass quantity of one or more fuel pulses will cause the fuel injector to open to a full lift amplitude. In one example, during idle conditions there may be durations of time when small quantity closely-spaced pulses are not needed, and a number of larger fuel pulses are sufficient for engine operation. As such conditions persist, the number of samples of fuel pulses having a quantity higher than a predetermined quantity threshold is increased. In some examples, a scaling factor for each injector is derived using one or more data filters to ensure stable value. OM calculations are scaled independently for each of the fuel injectors such that the respective maximum lift positions are all set to a normalized maximum open value, such as a value of 1.0.

Rescaled OM values carry better correlation to the amount of fuel metered—and thus are more effective (more accurate) for calculating opening delay. The real-time learning algorithm automatically rescales the opening magnitude measurement to remove part to part variation. Also, cumulative effects may be taken into account by maintaining a cumulative scaling factor for the OM calculation and performing an ongoing weighted average each time a subsequent scaling factor is determined. According to some examples, equation (1) below is used to calculate a current scaling factor $SF_n$.

$$SF_n = a * SF_{n-1} + b * X_n \quad (1)$$

Using the proportional weighting described above to determine the nth scaling factor $SF_n$, a first proportional scalar value a is applied to a previous scaling factor $SF_{n-1}$. Similarly, a second proportional scalar value b is applied to the newly-calculated scaling value $x_n$ which is based on newly-acquired data samples. According to some examples, the values of the proportional scalar values a and b may be based on the relative confidence levels of the previous scaling factor and the currently-calculated scaling factor values. In other examples the proportioning may be driven by a desire to avoid abrupt changes in the overall scaling factor, and thus afford less weight to the newly-calculated scaling factor for running value determinations. In this way, appropriate weight may be attributed to each of the previous value, as well as the new adjustment calculations to derive a running average of the adjustment scaling factor $SF_n$. Once OM scaling has been established, the scaling factor can be adjusted on an ongoing basis to maintain a cumulative scaling factor. Of course, there may be reset procedures, such as for fuel delivery diagnostics, to restore a scaling factor back to original calibration settings.

Figure 5:
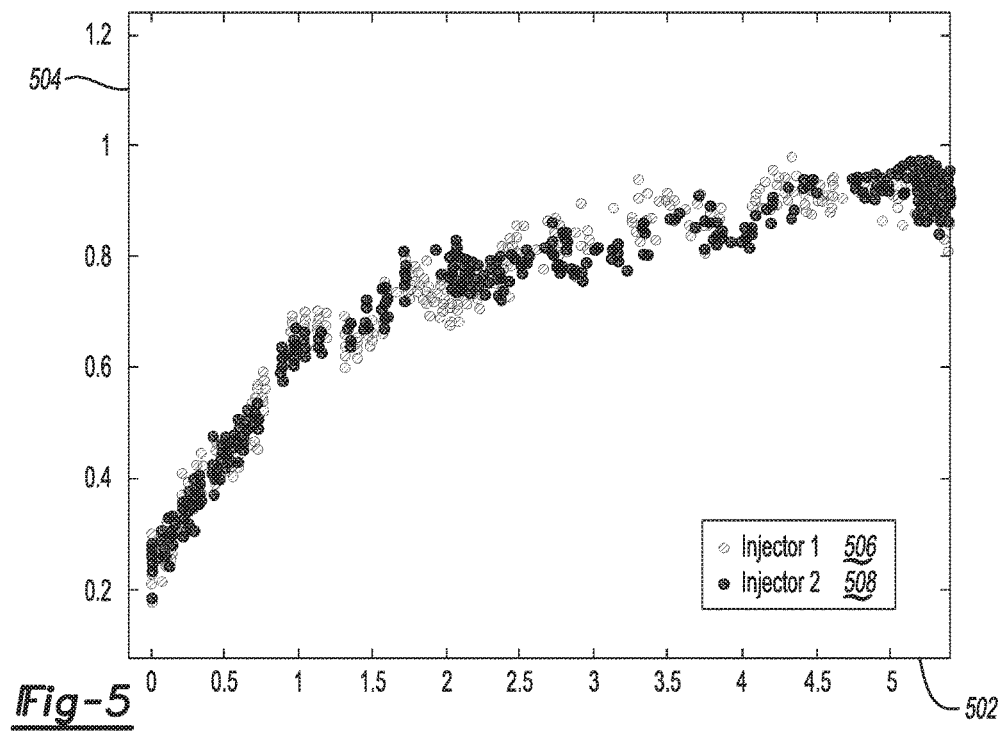
FIG. 5 is a plot of normalized opening magnitude versus fuel pulse quantity.

Referring to FIG. 5, plot 500 shows a correlation between the re-scaled OM values of the example fuel injectors discussed above, and the actual fuel mass delivered. Horizontal axis 502 represents fuel mass of the injection pulse in milligrams. Vertical axis 504 represents scaled opening magnitude OM as discussed above. Data set 506 corresponds to the first injector, and data set 508 corresponds to the second injector. It may be seen that virtually all of the error in fuel mass delivery due to attributed to part-to-part variation of the OM calculation is eliminated by the scaling applied to the OM calculation. Thus the scaled OM values may be suitable to calculate the opening delay of the fuel injector as discussed above.

Figure 6:
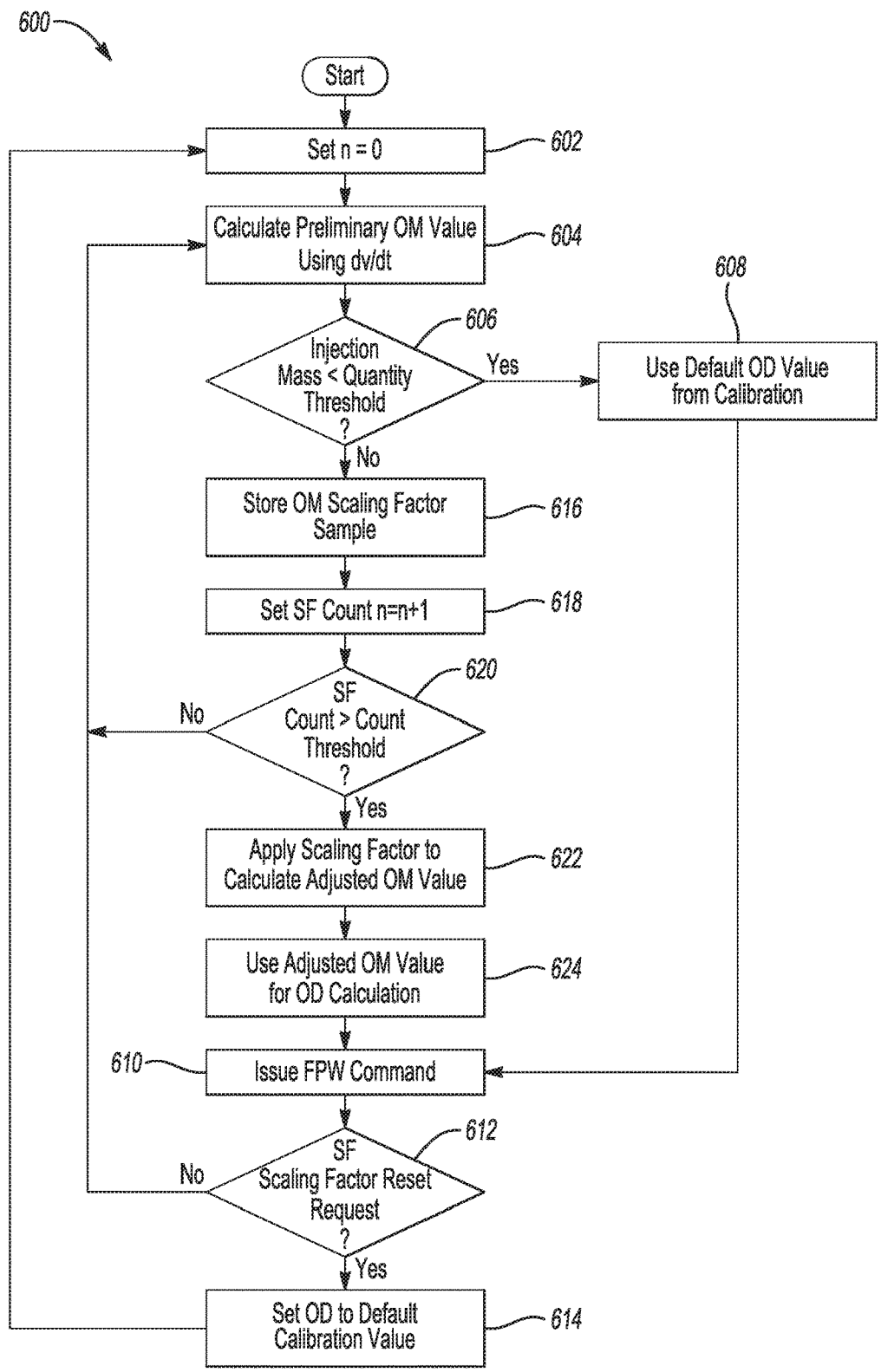
FIG. 6 is a flowchart of a method of normalizing fuel injector opening magnitude.

Referring to FIG. 6, a method 600 depicts steps of an algorithm to compensate for variation in the OM calculation. At step 602 a scaling factor counter n is set to zero to begin tracking the number of times which a scaling factor has been determined.

At step 604, the algorithm includes calculating a preliminary OM value for a fuel pulse based on a rate of change of the residual voltage at a fuel injector as discussed above. For example, the magnitude of change of dV/dt from a local minimum to the next local maximum correlates to the opening magnitude, or fuel injector valve lift height. As discussed above, the residual voltage profile following a fuel pulse may be unique to each fuel delivery system, each fuel injector model, and/or each fuel injector component within a given system.

If at step 606 the commanded fuel mass of the injection is less than a fuel quantity threshold, the algorithm may include bypassing a real-time OD calculation and rely on previously-stored calibration values. That is, if the fuel quantity delivered does not assure a fully lifted fuel injector valve, the algorithm includes disabling the real-time calculation of OD at step 608 and using the default OD value that was determined from a master fuel injector calibration. Thus a real-time calculation of OD is not enabled for each new fuel injector until there is sufficient opportunity to learn the appropriate scaling factor for measuring OM for each respective injector. In this case, the default OD value is used at step 610 to issue a FPW command for one or more fuel pulses. According to one example, a predetermined default OD value is used to adjust FPW commands which is based on the master fuel injector used for calibration If at step 606 the commanded fuel mass of the injection is equal to or greater than the fuel quantity threshold, the measured OM value may feed into the learning of the scaling factor for the given injector. At step 616 the algorithm includes storing a scaling factor data sample based on adjusting the measured OM to a predetermined value as discussed above in previous examples.

At step 618 the algorithm includes incrementing the scaling factor counter n to determine whether sufficient samples have been acquired to confidently characterize the performance of the particular fuel injector. If at step 620 the scaling factor counter is less than a count threshold, the algorithm returns to step 604 to continue to sample sufficiently large quantity fuel pulses to continue to refine the scaling factor for the given fuel injector.

If at step 620 the scaling factor counter is equal to or greater than the count threshold, the algorithm includes calculating an overall scaling factor for the fuel injector based on the collection of a number of OM scaling factor data samples. At step 622 the algorithm includes applying the overall scaling factor to a fuel pulse OM profile of a given fuel injector. The profile is normalized such that the stable portion of the curve is adjusted to a predetermined value based on a known full open fuel injector. The above normalization is performed independently for each fuel injector such that full open for each injector is set to the predetermined value.

At step 624 a normalized OM profile corresponding to each fuel injector is used to calculate a fuel pulse opening delay OD for the current operating conditions as discussed above. And, based on the expected OD of each fuel injector, a FPW command is generated at step 610 for each injector to result in a desired fuel mass and pulse timing for one or more fuel pulses of the injector. The ultimate FPW command is therefore adjusted as a function of both of the calculated OM value and the OD value.

At step 612 the algorithm includes polling for a scaling factor reset request. A reset request may be generated automatically by the controller in response to a system fault in order to clear any legacy adjustment values and restart the fuel injector scaling process. In other examples, the controller may automatically issue a reset request in response to the number of samples exceeding a maximum count threshold. In further alternate examples a reset request may be generated by a user wishing to diagnose a fault associated with the fuel injectors or following a component replacement. If no reset request is received at step 612 the algorithm includes continuing to monitor dV/dt at step 604 to determine appropriate OD data sampling to continue to adjust the scaling factor as required. As discussed above, the OM normalization process may be repeated on an ongoing basis over the life of each injector to account for performance differences due to aging effects.

On the other hand, if at step 612 a reset request is received, the algorithm includes setting OD and the OM scaling factor back to default calibration settings. The process then includes returning to step 602 to reset the scaling factor counter n to zero and restart the scaling process.

While the present disclosure has presented quantity-controlled fuel pulses in the context of a "first" pulse and a subsequent pulse, it is understood that the described method can also be applied to any subsequent pulse where a preceding full open pulse may be used for normalization. For example, a third pulse can be considered the "second" or subsequent pulse relative to the actual second pulse of a given sequence. That is, a given fuel pulse may be better controlled by applying data gathered from earlier pulses, particularly full open magnitude pulses. An earlier pulse may be preceding within a given sequence of pulses, or normalization data may be gathered from any of an earlier sequence of pulses altogether. Therefore calibrations that are developed as a function of the quantity of previous pulse and the dwell can be applied to later subsequent pulses. It is also understood that a pulse within a series of injection pulses may be affected by interactions of one or more prior injections. Calibration data and stored algorithm therefore may be more expansive using the techniques discussed herein and account for a larger number of pulses within a series.

It is further contemplated that the technique of using multiple closely-spaced injection events to control spray penetration may apply to any type of fast cycling fluid spray injectors that operate to spray fluid in a variety of applications not limited only to engine combustion chambers. Multiple successive injections may be used in numerous applications, such as, but not limited to urea injection used for diesel selective catalytic reduction (SCR) system, spray painting and other dispensing of liquid medications.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a combustion engine having at least one cylinder to burn a fuel;
at least one fuel injector configured to supply fuel mass pulses to the at least one cylinder; and
a controller programmed to
issue a first fuel pulse command to actuate the fuel injector allowing a pressurized fuel to pass through the fuel injector as a first fuel mass,
monitor a voltage across the fuel injector,
determine a preliminary fuel injector opening magnitude based on a rate of change of voltage,
in response to the first fuel mass being greater than a quantity threshold, assign the preliminary fuel injector opening magnitude as a maximum fuel injector opening magnitude value, and
apply a scaling factor to adjust a second fuel pulse command to normalize the maximum fuel injector opening magnitude value to a predetermined full open value.

2. The vehicle of claim 1 wherein the preliminary fuel injector opening magnitude comprises a plurality of samples, and the controller is further programmed to assign the preliminary fuel injector opening magnitude as a maximum fuel injector opening magnitude in response to the plurality of samples being greater than a count threshold.

3. The vehicle of claim 1 wherein the controller is further programmed to reset a sample count of the preliminary fuel injector opening magnitude in response to a reset request.

4. The vehicle of claim 1 wherein the preliminary fuel injector opening magnitude is further based on a difference between a local minimum and an adjacent local maximum of the rate of change of voltage.

5. The vehicle of claim 1 wherein the controller is further programmed to update the scaling factor in response to a subsequent fuel pulse command causing a fuel mass greater than the quantity threshold.

6. The vehicle of claim 1 wherein the controller is further programmed to apply a default adjustment value to the second fuel pulse in response to the first fuel mass being less than the quantity threshold.

7. The vehicle of claim 1 wherein the at least one fuel injector comprises a plurality of fuel injectors, and the controller is further programmed to apply a distinct scaling factor to independently adjust a command for each of the plurality of fuel injectors.

8. A method of providing quantity-controlled fluid pulses through a solenoid-driven valve comprising:
   providing a pressurized fluid at a valve inlet;
   commanding a first pulse of the valve to supply a first fluid mass through the valve;
   calculating at least one preliminary opening magnitude of the valve based on a change in residual voltage at the valve;
   in response to the preliminary opening magnitude causing a fluid mass greater than a mass threshold, assigning the preliminary opening magnitude as a maximum opening position;
   storing a scaling factor based on the maximum open position of the valve relative to a predetermined full open calibration value; and
   adjusting at least one subsequent fluid pulse command using the scaling factor.

9. The method of claim 8 further comprising applying a first adjustment to a fluid pulse command for a first valve based on a first change in residual voltage, and applying a second adjustment to a fluid pulse command for a second valve based on a second change in residual voltage.

10. The method of claim 8 wherein assigning the preliminary opening magnitude as the maximum opening position is based on a plurality of samples of at least one preliminary opening magnitude, the plurality of samples being greater than a count threshold.

11. The method of claim 8 further comprising resetting a sample count of the preliminary opening magnitude in response to a reset request.

12. The method of claim 8 wherein the preliminary opening magnitude is further based on a magnitude of change between a local minimum and an adjacent local maximum of the residual voltage.

13. The method of claim 8 further comprising updating the scaling factor in response to at least one subsequent fluid pulse command corresponding to a fluid mass greater than the mass threshold.

14. The method of claim 8 further comprising applying a default adjustment value to the at least one subsequent fluid pulse command in response to the first pulse causing a fluid mass less than the mass threshold.

15. A fluid delivery system comprising:
   a solenoid configured to selectively lift a pintle of a valve to allow a pressurized fluid to pass through the valve;
   a power source to supply energy to actuate the solenoid; and
   a controller programmed to
      issue commands to actuate the solenoid to cause a plurality of fluid pulses,
      monitor a voltage across the solenoid,
      determine a first lift height based on the monitored voltage during a first fluid pulse,
      in response to a fluid mass of the first fluid pulse being greater than a quantity threshold, assign the first lift height as a maximum lift height, and
      apply a scaling factor to adjust at least one subsequent fluid pulse to normalize the maximum lift height to a predetermined full open value.

16. The fluid delivery system of claim 15 wherein the controller is further programmed to assign the first lift height as the maximum lift height based on a plurality of samples of the monitored voltage corresponding to multiple fluid pulses, the plurality of samples being greater than a count threshold.

17. The fluid delivery system of claim 15 wherein the first lift height is further based on a magnitude of change from a local minimum to an adjacent local maximum of the monitored voltage.

18. The fluid delivery system of claim 15 wherein the controller is further programmed to update the scaling factor in response to the at least one subsequent fluid pulse causing a fluid mass greater than the quantity threshold.

19. The fluid delivery system of claim 15 wherein the controller is further programmed to apply a default adjustment value to the at least one adjust subsequent fluid pulse in response to the fluid mass of the first fluid pulse being less than the quantity threshold.

20. The fluid delivery system of claim 15 wherein controller is further programmed to apply a first adjustment to a fluid pulse command for a first valve based on a first change in monitored voltage, and applying a second adjustment to a fluid pulse command for a second valve based on a second change in monitored voltage.

* * * * *